Figure 1:
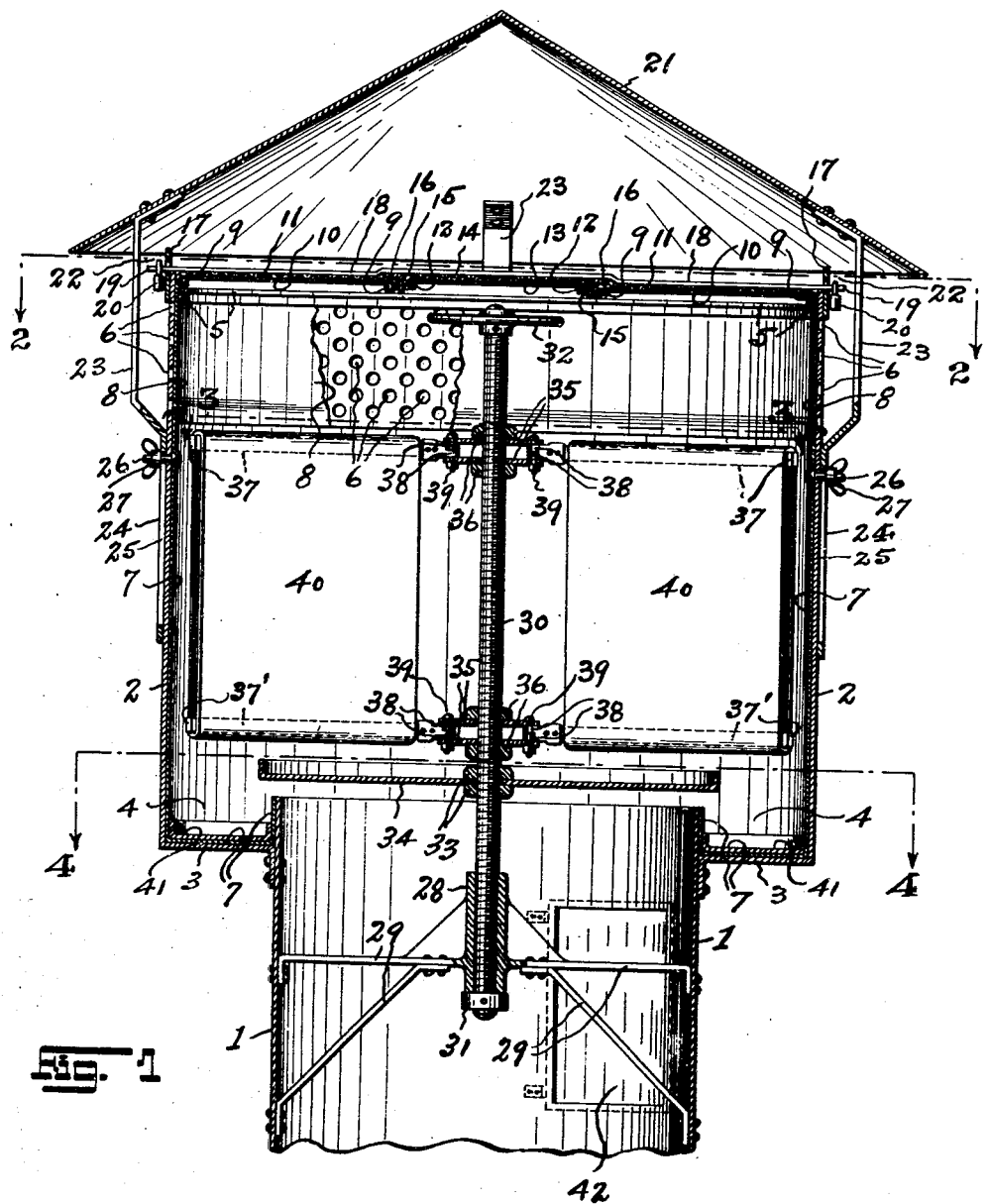

C. E. HOLLAND.
DUST COLLECTOR.
APPLICATION FILED MAY 28, 1919.

1,354,483.

Patented Oct. 5, 1920.
2 SHEETS—SHEET 1.

INVENTOR
Charles E. Holland,
BY
Frantzel and Richards
ATTORNEYS

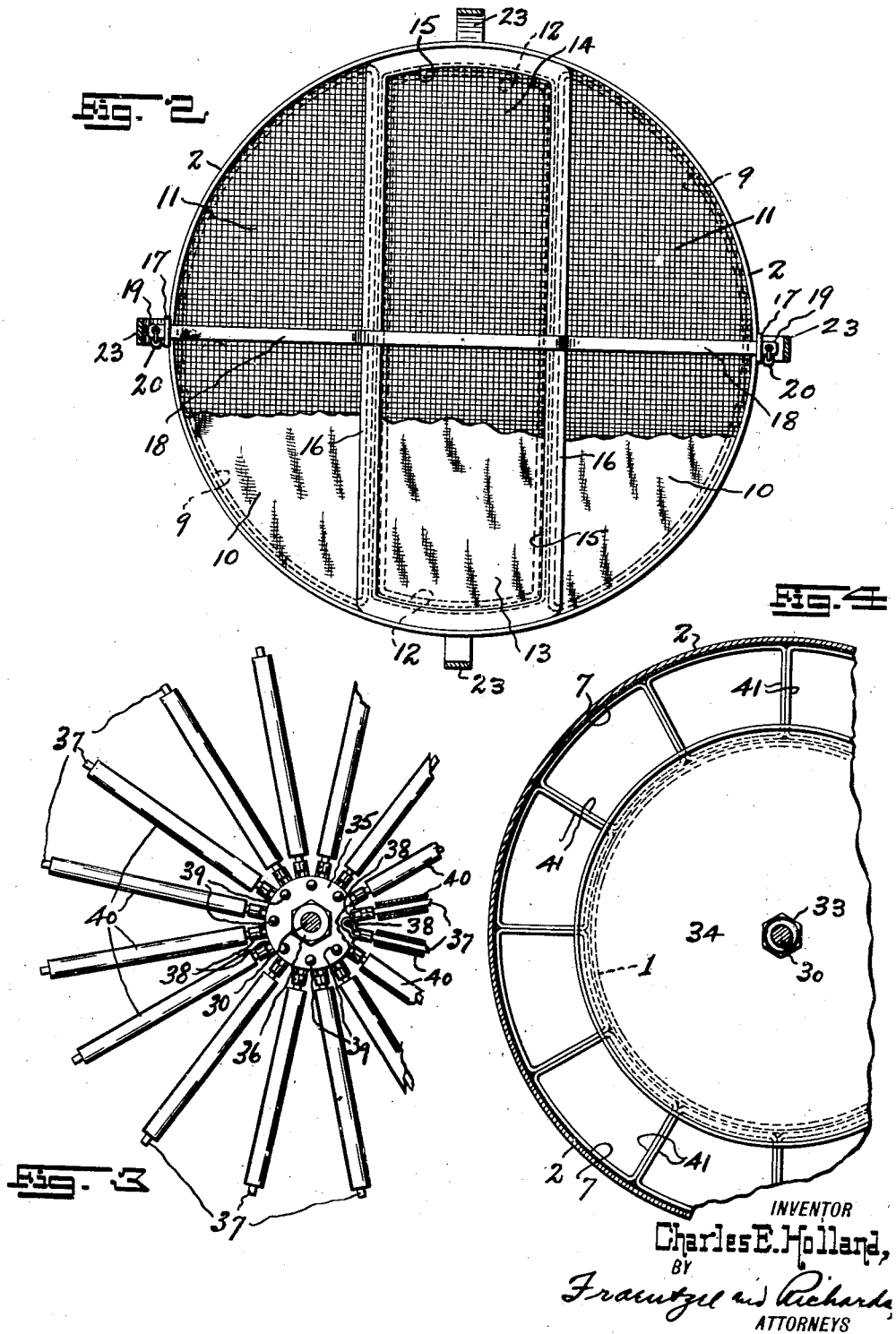

UNITED STATES PATENT OFFICE.

CHARLES E. HOLLAND, OF NEW YORK, N. Y.

DUST-COLLECTOR.

1,354,483.  Specification of Letters Patent.  Patented Oct. 5, 1920.

Application filed May 28, 1919. Serial No. 300,370.

*To all whom it may concern:*

Be it known that I, CHARLES E. HOLLAND, a citizen of the United States, residing at New York, in the county of New York and State of New York, have invented certain new and useful Improvements in Dust-Collectors; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention relates, generally, to apparatus known to the art as dust-collectors; and, the invention has reference, more particularly, to an air filtering mechanism for separating and collecting dust and other foreign substances carried in suspension in air.

The invention has for its principal object to provide an air filtering apparatus for use in reclaiming and recovering fine particles of valuable metals which are carried in suspension in the air; and the apparatus is especially adapted for use in the factories of jewelers for the separation and collection from the air, exhausted from the vicinity of buffing, polishing and other machines, of fine particles of precious metals, such as gold, silver, platinum, etc. It is the present practice in manufacturing jewelry establishments, to exhaust the air which may be laden with particles of precious metals into a tank or gravity separator situated on the roof of the factory building, in which tank or gravity separator the air circulates, before its final escape, for the purpose of allowing particles of metal to drop out of the air current into suitable catching devices or receptacles. Such equipment is well known in the art, and serves to reclaim the heavier particles of metal, but, nevertheless, does permit a valuable quantity of very fine metal dust to escape with the finally released air. It is the purpose of my present invention to provide a means for reclaiming and recovering even this very fine metal dust, said means being capable of operating with and auxiliary to the present tank collectors or gravity separators.

Other objects of the present invention, not at this time more particularly enumerated, will be clearly understood from the following detailed description of the same.

With the various objects of my present invention in view, the same consists, primarily, in the novel air filtering dust-collector hereinafter set forth; and, the invention consists, furthermore, in the novel arrangements and combinations of the various devices and parts, as well as in the details of the construction of the same, all of which will be hereinafter more fully set forth in the following specification, and then finally embodied in the claims which are appended thereto.

The invention is clearly illustrated in the accompanying drawings, in which:—

Figure 1 is a vertical longitudinal section of the novel air filtering dust-collector made according to and embodying the principles of my present invention.

Fig. 2 is a horizontal section taken on line 2—2 in said Fig. 1; Fig. 3 is a detail horizontal section taken on line 3—3 in said Fig. 1; and Fig. 4 is a detail horizontal section taken on line 4—4 in said Fig. 1; the last two sections having portions broken away.

Similar characters of reference are employed in all of the above described views, to indicate corresponding parts.

Referring now to the said drawings, the reference-character 1 indicates the air outlet end or pipe of any ordinary form of gravity separator through which the air is finally discharged therefrom into the atmosphere. Preferably my novel air filtering dust-collector is connected operatively with said outlet pipe 1 so as to receive the air discharged through the latter. The novel air filtering dust-collector comprises a cylindrical casing 2 of somewhat larger diameter than the diameter of the said outlet pipe 1, into the bottom 3 of which extends said outlet pipe 1 so that the latter communicates with the interior of said casing 2. The end of said outlet pipe 1 extends for a short distance into said casing 2 so as to provide an annular space 4 between the walls of the former and said casing 2. Said casing 2 is open at its upper end, but is provided within said upper open end with an annular flange 5, preferably formed of angle iron, adapted to support suitable filter covers in closing relation to said open end. A portion of the area of the side walls of said casing 2 immediately adjacent to its upper open end is provided with a multiplicity of perforations or openings 6. The inner surface of the walls of said casing 2, below the area perforated with the openings 6, is lined or covered with a lining 7, of suitable fabric, such as canton flannel. Said lining 7 is carried across the bottom 3 of said casing 2 and upwardly against the sides of the inwardly projecting portion of said outlet pipe 1, said lining 7 being secured in place by any fastening means or method found desirable or convenient. In like manner, the inner surface of the perforated area of said casing walls is covered with a lining 8 of thin fabric, such as cheese-cloth, which thin material provides a filtering screen readily admitting the escape of air therethrough while holding back any metallic particles which may still be carried in suspension in the air.

The upper open end of said casing 2 is normally closed by a suitable filter cover. The said filter cover is preferably made in sections adapted to interlock together when in proper assembled relation to said casing 2. To this end I provide two side filter cover sections and a center or intermediate filter cover section. The said side sections each comprise an open peripheral frame 9, shaped to conform to that portion of the open end of the casing wherein the same is to be mounted. Stretched upon and supported by said frame 9 is a fabric screen 10, preferably made of cheese-cloth which permits the air to pass therethrough while holding back the fine particles of metal. Secured upon said frame 9 so as to extend over and above said fabric screen 10 is a guard-member 11, preferably made of open wire mesh, the same serving to retain the fabric screen 10 against disruption or displacement under the pressure of the air forced therethrough. Each side filter cover section is arranged in place at the respective side portions of the area of the open end of said casing 2, and is supported in proper assembled position, by engagement with said annular flange 5. The central or intermediate filter cover section comprises a peripheral frame 12 of proper conforming shape, upon which is supported or stretched a fabric screen 13, of cheese-cloth or the like, over which is secured a guard-member 14 of wire mesh or the like. Said central or intermediate filter cover section is secured within a marginal frame 15 provided with an outwardly projecting marginal flange 16 which overlaps the adjacent edge-portions of said assembled side filter cover sections so as to be supported thereby. In order to prevent unauthorized opening of said casing 2, by the removal of said filter cover sections, a suitable locking or fastening means is provided; the same comprising a pair of diametrically opposite upwardly extending perforate ears or lugs 17, which are fixed to the side walls of said casing so as to project above the upper end thereof, and a diametrically extending lock-bar 18 which is passed through said perforate ears or lugs 17 so as that its ends 19 extend outwardly therethrough, said lock-bar 18 extending across the assembled filter cover sections to prevent their removal or displacement. Said ends 19 of said lock-bar are perforated to permit the respective engagement therewith of suitable locking means, such as the padlocks 20, which when so engaged prevent the removal of the lock-bar until said padlocks are first removed.

The reference-character 21 indicates a suitable hood or rain-shed, which is mounted over the upper end of said casing 2 to protect said filter cover sections and the interior of the casing 2 against the weather. This hood or rain-shed is so related to said casing 2, that it is normally spaced slightly above the end thereof, to provide an annular air escape space 22, but is also arranged so as to be movable in an upward direction so that access may be had to the filter cover sections, and when the latter are removed to the interior of the casing 2. To this end said hood or rain-shed is provided with bracket members 23, the lower ends 24 of which are offset inwardly to engage the same against the outer sides of the casing 2, said lower ends 24 having therein longitudinal vertical slots 25, through which pass threaded studs 26 anchored in the walls of said casing 2. The studs 26 receive lock-nuts 27 which are screwed home thereon to bind said brackets to said casing 2. When it is desired the lock-nuts 27 are loosened so that the hood or rain-shed may be raised vertically to the limit imposed by the length of the slots 25, and thereupon fastened again to hold said hood or rain-shed in such raised position.

Arranged within said outlet pipe 1, in a central position therein, is a vertical stationary nut-piece 28, suitably supported by bracket-members 29. Threaded into said nut-piece 28, for vertically adjusting movement relative thereto, is a screw-threaded shaft 30, which extends vertically and centrally upward through the interior of said casing 2. A collar 31 secured on the lower extremity of said shaft 30 limits its upward movement in said nut-piece, and determines its normal position. A hand-wheel 32 fixed to the upper extremity of said shaft 30 is provided for turning the latter. Fixed upon said shaft 30 by means of lock-nuts 33 is a trap-disk 34, which is somewhat larger in diameter than the diameter of said outlet pipe 1, and which when said shaft 30 is in normal position is disposed a short distance above the discharge mouth of said outlet-pipe. When it is desired to close said outlet-pipe 1 to prevent the delivery of air thereby into the interior of said casing 2, as is desirable when cleaning out the casing 2, the shaft 30 may be turned in the nut-piece 28 to move the former downward, and thus carry said trap-disk 34 into closed relation to the discharge mouth of said outlet pipe 1. When said trap-disk is raised to normal position, it also serves to deflect the air toward the sides of said casing 2, as said air enters the latter, so as to distribute the air throughout the interior of the same.

Mounted upon said shaft 30 above said trap-disk are a plurality of radiating collecting-baffles, between and in contact with which the dust laden air passes on its way to the filter screened discharge vents formed by the perforated section of the casing walls and the screened open end of the casing all above described. The said collecting-baffles and the means for mounting the same, comprise vertically spaced pairs of hub-plates 35, each pair of hub-plates being secured in desired position on said shaft 30 by means of lock nuts 36. Pivotally connected with said upper set of hub-plates is an upper set of radiating arms 37, the same being arranged in pairs each pair of arms having at their inner ends mutually associated hinge-pieces 38 pivoted between said upper pair of hub-plates by means of fulcrum bolts 39, which are passed through said hub plates and said mutually associated hinge-pieces 38. As thus arranged said upper set of radiating arms all project outwardly from and around said pair of hub-plates. Pivotally connected with said lower set of hub-plates is a lower set of radiating arms 37′, the same being arranged and mounted in the same manner as already above described with respect to said upper set of arms. Said lower set of arms 37′ are arranged in vertically opposed relation to said upper set of arms 37. Supported upon each pair of vertically opposite arms 37 and 37′ thus provided is a fabric-baffle-member 40, preferably made of canton flannel, or some such material, the same being of a double thickness of the material joined at its upper and lower ends so as to be engaged over said arms 37 and 37′.

Arranged in the annular space 4, at the bottom of said casing 2, are a plurality of removable catch-pans 41.

In operation the device receives the dust laden air from the outlet pipe 1, the same being thus introduced into the interior of the casing 2, and spread by the raised trap-disk so as to be well distributed at all sides of the interior of said casing. Upon entering the casing 2, the air is carried upwardly against the fabric lined sides of the casing, and between and in contact with the collecting baffles 40, so that much of the dust and fine metallic particles suspended therein, are thus brought into contact with said fabric lining 7 and with the fabric baffle-members 40 to which the dust and fine metallic particles adhere, and are thus arrested out of the moving air current. The air after passing by the baffle-members 40, and the lining 7 of the casing, reaches the upper end of the latter, and there seeks its escape through the perforations 6, and through the upper open end of the casing, to pass through which, however, it must penetrate through the cheese-cloth screens covering said perforations and opening, so that such fine dust and particles of metal which still accompany the air are arrested and held back by said screening devices. As the separated metallic particles accumulate upon the lining 7, the baffles 40 or the screens above mentioned, some of the same may fall by accumulated weight into the catch-pans 41, and some of the heavier metallic particles will drop out of the air current directly into the catch-pans 41, and also when cleaning the device such dust as is shaken off of the screens, lining 7, or baffle members 40, will also fall into the catch-pans 41, or upon the trap-disk 34. When the air finally escapes from the device, it has been practically freed from its entire burden of fine metallic particles, which have been retained within the casing, and this is accomplished without unduly obstructing, checking or choking the normal flow of air as it issues from the outlet-pipe. The old and well known gravity separator, to the outlet pipe 1 of which I prefer to connect my device, has already, as will be understood, separated the heavier particles of metallic dust from the air, so that such dust and metallic particles as are recovered by my device, consists almost entirely of the very minute and fine particles which escape from the gravity separator, and which would ordinarily, without the interposition or aid of my device, be lost. The accumulation of fine metallic dust collected in my device is of substantial value, and has in a certain installation of my device exceeded fifty dollars a month.

When it is desired to clean out my device and remove the accumulation of dust and precious metal, I first open a door 42 which I provide in the outlet pipe 1, so that the air seeking the path of least resistance flows directly out therethrough from the gravity separator. I then raise the hood or rain-shed and remove the filter cover sections, and by screwing down the shaft 30, carry the trap-disk 34 into closed relation to said outlet pipe 1, so as to entirely shut off the air from the interior of the casing 2. I can now remove the baffle-members, linings filter-screens and catch-pans, and have the accumulation of dust and metal removed therefrom by any desired method of cleaning, or I can leave the linings and baffle-members in place, and by using a vacuum cleaner nozzle remove the dust and metal therefrom. In the latter case, the supporting arms 37 and 37' being conveniently pivoted, they may be swung apart relatively to each other so that the vacuum cleaner nozzle may be readily and easily applied to all portions of the surface of the baffle-members 40.

I am aware that some changes may be made in the arrangements and combinations of the various devices and parts, as well as in the details of the construction of the same, without departing from the scope of my present invention as set forth in the foregoing specification, and as defined in the appended claims. Hence, I do not limit my invention to the exact arrangements and combinations of the several devices and parts as described in the foregoing specification, nor do I confine myself to the exact details of the construction of the said parts as illustrated in the accompanying drawings.

I claim:—

1. In a device of the kind described, a casing having an inlet opening in its lower end, filter screen means closing the upper end of said casing, a plurality of removable radially disposed vertical baffle-members, means for supporting said baffle-members within said casing, said baffle-members being comprised of fabric material.

2. The combination with the outlet pipe of a gravity separator or the like of a casing of enlarged diameter relative to said outlet pipe, said casing having an opening in its lower end through which said outlet pipe enters, filter screen means closing the upper end of said casing, a plurality of radially disposed vertical baffle-members, means for supporting said baffle-members within said casing, said baffle-members being comprised of fabric material, and a trap-disk movable to close communication between said outlet pipe and said casing.

3. The combination with the outlet pipe of a gravity separator or the like of a cylindrical casing of relatively larger diameter than said outlet pipe, said casing having a closed lower end provided with an opening through which said outlet pipe enters, a lining of fabric material covering the inner wall surfaces of said casing, detachable filter screen covers for closing the upper end of said casing, a plurality of radially disposed vertical baffle-members, means for supporting said baffle-members within said casing, said baffle-members being comprised of fabric material, and a trap-disk movable to close communication between said outlet pipe and said casing.

4. The combination with the outlet pipe of a gravity separator or the like of a cylindrical casing of relatively larger diameter than said outlet pipe, said casing having a closed lower end provided with an opening through which said outlet pipe enters, a lining of fabric material covering the inner wall surfaces of said casing, detachable filter screen covers for closing the upper end of said casing, a vertical centrally disposed threaded shaft within said casing, a stationary nut-piece in which said shaft is mounted, a normally open trap-disk fixed on said shaft but movable by turning said shaft in said nut-piece to closed relation to said outlet pipe, a plurality of radially disposed vertical baffle-members of fabric material, and means connected with said shaft for supporting said baffle-members.

5. The combination with the outlet pipe of a gravity separator or the like of a cylindrical casing of relatively larger diameter than said outlet pipe, said casing having a closed lower end provided with an opening through which said outlet pipe enters, a lining of fabric material covering the inner wall surfaces of said casing, detachable filter screen covers for closing the upper end of said casing, means for locking said filter screen covers in operative position, a vertical centrally disposed threaded shaft within said casing, a stationary nut-piece in which said shaft is mounted, a normally open trap-disk fixed on said shaft but movable by turning said shaft in said nut-piece to closed relation to said outlet pipe, a plurality of radially disposed vertical baffle-members of fabric material, means connected with said shaft for supporting said baffle-members, a conical hood connected with said casing to extend over its upper end, and means rendering said hood vertically movable above said casing.

6. The combination with the outlet pipe of a gravity separator or the like of a cylindrical casing of relatively larger diameter than said outlet pipe, said casing having a closed lower end provided with an opening through which said outlet pipe enters, a lining of fabric material covering the inner wall surfaces of said casing, detachable filter screen covers for closing the upper end of said casing, means for locking said filter screen covers in operative position, a vertical centrally disposed threaded shaft within said casing, a stationary nut-piece in which said shaft is mounted, a normally open trap-disk fixed on said shaft but movable by turning said shaft in said nut-piece to closed relation to said outlet pipe, a plurality of radially disposed vertical baffle-members of fabric material, means connected with said shaft for supporting said baffle-members, comprising an upper and lower pair of hub-disks fixed upon said shaft, radially extending upper and lower arms respectively pivoted to said upper and lower pairs of hub-disks, said arms being adapted to support said baffle-members in extension between vertically opposite upper and lower arms.

7. The combination with the outlet pipe of a gravity separator or the like of a cylindrical casing of relatively larger diameter than said outlet pipe, said casing having a closed lower end provided with an opening through which said outlet pipe enters, a lining of fabric material covering the inner wall surfaces of said casing, detachable filter screen covers for closing the upper end of said casing, means for locking said filter screen covers in operative position, a vertical centrally disposed threaded shaft within said casing, a stationary nut-piece in which said shaft is mounted, a normally open trap-disk fixed on said shaft but movable by turning said shaft in said nut-piece to closed relation to said outlet pipe, a plurality of radially disposed vertical baffle-members of fabric material, means connected with said shaft for supporting said baffle-members, comprising an upper and lower pair of hub-disks fixed upon said shaft, radially extending upper and lower arms respectively pivoted to said upper and lower pairs of hub-disks, said arms being adapted to support said baffle members in extension between vertically opposite upper and lower arms, a conical hood connected with said casing to extend over its upper end, and means rendering said hood vertically movable above said casing.

8. The combination with the outlet pipe of a gravity separator or the like of a cylindrical casing of relatively larger diameter than said outlet pipe, said casing having a closed lower end provided with an opening through which said outlet pipe enters, a portion of the wall area of the upper end of said casing having a plurality of outlet perforations, a screen of fabric material covering the inner side of said perforated wall area, a lining of fabric material covering the remaining inside wall area of said casing, a plurality of screen cover sections, each comprising a peripheral frame, a screen of fabric material stretched on said frame, and a guard of metallic mesh extending over said screen, means for supporting said cover sections in closed relation to the upper open end of said casing, a plurality of radially disposed vertical fabric baffle-members, means for supporting said baffle-members within said casing, and a trap-disk movable to close communication between said outlet pipe and said casing.

9. The combination with the outlet pipe of a gravity separator or the like of a cylindrical casing of relatively larger diameter than said outlet pipe, said casing having a closed lower end provided with an opening through which said outlet pipe enters, a portion of the wall area of the upper end of said casing having a plurality of outlet perforations, a screen of fabric material covering the inner side of said perforated wall area, a lining of fabric material covering the remaining inside wall area of said casing, a plurality of screen cover sections, each comprising a peripheral frame, a screen of fabric material stretched on said frame, and a guard of metallic mesh extending over said screen, means for supporting said cover sections in closed relation to the upper open end of said casing, a plurality of radially disposed vertical fabric baffle - members, means for supporting said baffle-members within said casing, a trap-disk movable to close communication between said outlet pipe and said casing, a conical hood connected with said casing to extend over its upper end, and means rendering said hood vertically movable above said casing.

10. The combination with the outlet pipe of a gravity separator or the like of a cylindrical casing of relatively larger diameter than said outlet pipe, said casing having a closed lower end provided with an opening through which said outlet pipe enters, a portion of the wall area of the upper end of said casing having a plurality of outlet perforations, a screen of fabric material covering the inner side of said perforated wall area, a lining of fabric material covering the remaining inside wall area of said casing, a plurality of screen cover sections, each comprising a peripheral frame, a screen of fabric material stretched on said frame, and a guard of metallic mesh extending over said screen, means for supporting said cover sections in closed relation to the upper end of said casing, a vertical centrally disposed threaded shaft within said casing, a stationary nut-piece in which said shaft is mounted, a normally open trap-disk fixed on said shaft, but movable by turning said shaft in said nut-piece to closed relation to said outlet pipe, a plurality of radially disposed vertical baffle-members of fabric material, and means connected with said shaft for supporting said baffle-members.

11. The combination with the outlet pipe of a gravity separator or the like of a cylindrical casing of relatively larger diameter than said outlet pipe, said casing having a closed lower end provided with an opening through which said outlet pipe enters, a portion of the wall area of the upper end of said casing having a plurality of outlet perforations, a screen of fabric material covering the inner side of said perforated wall area, a lining of fabric material covering the remaining inside wall area of said casing, a plurality of screen cover sections, each comprising a peripheral frame, a screen of fabric material stretched on said frame, and a guard metallic mesh extending over said screen, means for supporting said cover sections in closed relation to the upper open end of said casing, a vertical centrally disposed threaded shaft within said casing, a stationary nut-piece, in which said shaft is mounted, a normally open trap-disk fixed on said shaft but movable by turning said shaft in said nut-piece to closed relation to said outlet pipe, a plurality of radially disposed vertical baffle-members of fabric material, means connected with said shaft for supporting said baffle-members, a conical hood connected with said casing to extend over its upper end, and means rendering said hood vertically movable above said casing.

12. The combination with the outlet pipe of a gravity separator or the like of a cylindrical casing of relatively larger diameter than said outlet pipe, said casing having a closed lower end provided with an opening through which said outlet pipe enters, a portion of the wall area of the upper end of said casing having a plurality of outlet perforations, a screen of fabric material covering the inner side of said perforated wall area, a lining of fabric material covering the remaining inside wall area of said casing, a plurality of screen cover sections, each comprising a peripheral frame, a screen of fabric material stretched on said frame, and a guard metallic mesh extending over said screen, means for supporting said cover sections in closed relation to the upper open end of said casing, a vertical centrally disposed threaded shaft within said casing, a stationary nut-piece in which said shaft is mounted, a normally open trap-disk fixed on said shaft but movable by turning said shaft in said nut-piece to closed relation to said outlet pipe, a plurality of radially disposed vertical baffle-members of fabric material, means connected with said shaft for supporting said baffle-members, comprising an upper and lower pair of hub-disks fixed upon said shaft, radially extending upper and lower arms respectively pivoted to said upper and lower pairs of hub-disks, said arms being adapted to support said baffle-members in extension between vertically opposite upper and lower arms.

13. The combination with the outlet pipe of a gravity separator or the like of a cylindrical casing of relatively larger diameter than said outlet pipe, said casing having a closed lower end provided with an opening through which said outlet pipe enters, a portion of the wall area of the upper end of said casing having a plurality of outlet perforations, a screen of fabric material covering the inner side of said perforated wall area, a lining of fabric material covering the remaining inside wall area of said casing, a plurality of screen cover sections, each comprising a peripheral frame, a screen of fabric material stretched on said frame, and a guard metallic mesh extending over said screen, means for supporting said cover sections in closed relation to the upper open end of said casing, a vertical centrally disposed threaded shaft within said casing, a stationary nut-piece in which said shaft is mounted, a normally open trap-disk fixed on said shaft, but movable by turning said shaft in said nut-piece to closed relation to said outlet pipe, a plurality of radially disposed vertical baffle-members of fabric material, means connected with said shaft for supporting said baffle-members, comprising an upper and lower pair of hub-disks fixed upon said shaft, radially extending upper and lower arms respectively pivoted to said upper and lower pairs of hub-disks, said arms being adapted to support said baffle members in extension between vertically opposite upper and lower arms, a conical hood connected with said casing to extend over its upper end, and means rendering said hood vertically movable above said casing In testimony that I claim the invention set forth above I have hereunto set my hand this 21st day of May, 1919.

CHARLES E. HOLLAND.

Witnesses:
GEORGE D. RICHARDS,
BEATRICE SONTAG.